(12) United States Patent
Saylor et al.

(10) Patent No.: US 11,338,676 B2
(45) Date of Patent: May 24, 2022

(54) LOAD SENSING SYSTEM FOR A VEHICLE AND METHOD OF INHIBITING VEHICLE MOVEMENT BASED ON SENSED LOAD

(71) Applicant: GM GLOBAL TECHNOLOGY OPERATIONS LLC, Detroit, MI (US)

(72) Inventors: Brian K. Saylor, South Lyon, MI (US); Christopher J. Mettrick, Whitby (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/896,495

(22) Filed: Jun. 9, 2020

(65) Prior Publication Data
US 2021/0379991 A1 Dec. 9, 2021

(51) Int. Cl.
*B60K 28/08* (2006.01)
*B60G 17/019* (2006.01)
*B60G 17/017* (2006.01)

(52) U.S. Cl.
CPC .......... *B60K 28/08* (2013.01); *B60G 17/017* (2013.01); *B60G 17/019* (2013.01); *B60G 2400/0511* (2013.01); *B60G 2400/0512* (2013.01); *B60G 2400/252* (2013.01); *B60G 2400/60* (2013.01); *B60G 2600/0422* (2013.01); *B60G 2800/019* (2013.01)

(58) Field of Classification Search
CPC .. G01G 19/086; B60G 17/015; B60G 17/019; B60G 17/017; B60G 2400/60; B60G 2400/0511; B60G 2800/019; B60G 2400/0512; B60G 2600/0422; B60G 2400/252; F02D 41/042; F02D 41/06; B60K 28/08
See application file for complete search history.

(56) References Cited

U.S. PATENT DOCUMENTS 463,315 A * 11/1891 Hockett .................... F02N 5/02
185/41 R
8,396,627 B2 3/2013 Jung et al.
(Continued)

FOREIGN PATENT DOCUMENTS

CA 2359328 A1 * 7/2000 ............ B60T 8/1843
CA 2456381 C * 5/2008 ........... B60G 17/018
(Continued)

OTHER PUBLICATIONS

P. Varet, FR 2689463, Machine English Translation, ip.com (Year: 1993).*
(Continued)

*Primary Examiner* — Karen Beck
(74) *Attorney, Agent, or Firm* — Cantor Colburn LLP

(57) ABSTRACT

A vehicle includes a frame, a body supported by the frame, a prime mover mounted to the frame, at least one axle connected to the frame, a suspension system connecting the at least one axle to the frame, and a load sensing and control system including at least one load sensor connected to the suspension system and a controller operatively connected to the at least one load sensor and the prime mover. The controller being operable to calculate a vehicle loading factor before the vehicle moves and to prevent operation of the prime mover if the vehicle loading factor that exceeds a selected load threshold.

16 Claims, 2 Drawing Sheets

(56) References Cited

U.S. PATENT DOCUMENTS

| | | | |
|---|---|---|---|
| 10,395,437 B2 * | 8/2019 | Seaman | B60W 50/038 |
| 10,858,011 B1 * | 12/2020 | Christensen | B60K 28/08 |
| 2017/0334290 A1 * | 11/2017 | Homsangpradit | B60W 30/02 |
| 2018/0186208 A1 * | 7/2018 | Coombs | B60G 17/0152 |
| 2020/0317212 A1 * | 10/2020 | Rogness | B60D 1/248 |

FOREIGN PATENT DOCUMENTS

| | | | | |
|---|---|---|---|---|
| CN | 105828028 A * | 8/2016 | | B60W 10/10 |
| CN | 106627138 A * | 5/2017 | | B60G 17/017 |
| DE | 19918679 A1 | 10/2000 | | |
| DE | 102014215440 A1 | 2/2016 | | |
| DE | 102017009426 A1 | 9/2018 | | |
| EP | 1455071 A2 * | 9/2004 | | F02D 41/0225 |
| EP | 1905618 A1 * | 3/2007 | | |
| FR | 2689463 A1 * | 10/1993 | | B60K 28/08 |
| JP | 3559200 B2 * | 8/2004 | | B60W 10/10 |
| JP | 4552365 B2 * | 9/2010 | | B60W 50/0097 |
| KR | 0140210 Y1 * | 4/1999 | | B60T 8/1843 |
| KR | 2000557 B1 * | 7/2019 | | B60W 50/0097 |
| WO | WO-0209966 A1 * | 2/2002 | | B60K 23/0808 |

OTHER PUBLICATIONS

Y.H. Kim, KR 0140210Y1 Machine English Translation, ip.com (Year: 1999).*
Trudeau et al. CA2456381C, ip.com (Year: 2004).*
Kim et al. KR 10-2000 557B1, Machine English Translation, ip.com (Year: 2019).*
German Office Action for German Application No. 10 2021 107 779.6; Office Action dated Feb. 25, 2022 (pp. 1-6).

* cited by examiner

LOAD SENSING SYSTEM FOR A VEHICLE AND METHOD OF INHIBITING VEHICLE MOVEMENT BASED ON SENSED LOAD

INTRODUCTION

The subject disclosure relates to the art of motor vehicles and, more particularly, to a load sensing system for a vehicle and a method of inhibiting vehicle movement based on sensed load.

Motor vehicles generally include a suspension that is designed to support a defined weight. Loading a vehicle in excess of that defined weight may induce excessive wear on suspension components. Owners and/or drivers of conventional vehicles generally understand visual clues that can indicate that a vehicle is loaded in excess of the defined weight. Visual clues can include springs hitting spring stops, shock absorbers being compressed more than normal, tires bulging and the like. If one or more of the visual clues are apparent, the owner/driver may take remedial action before driving.

In contrast, a passenger or a person loading a shared or autonomous vehicle may not understand or care about visual clues indicating an over loaded condition. If the shared or autonomous vehicle is overloaded, it may still be operated thereby placing additional wear on suspension components. Increasing and/or hastening wear on suspension components leads to increased maintenance costs for the vehicle. Accordingly, it is desirable to provide a system for sensing vehicle loading and limiting vehicle movement based on sensed load.

SUMMARY

In one exemplary embodiment, a vehicle includes a frame, a body supported by the frame, a prime mover mounted to the frame, at least one axle connected to the frame, a suspension system including a suspension component connecting the at least one axle to the frame, and a load sensing and control system including at least one load sensor connected to the suspension system and a controller operatively connected to the at least one load sensor and the prime mover. The controller being operable to calculate a vehicle loading factor before the vehicle moves and to prevent operation of the prime mover if the vehicle loading factor exceeds a selected load threshold.

In addition to one or more of the features described herein, the suspension system includes at least two springs connected to the at least one axle, wherein the at least one load sensor detects an amount of compression of each of the at least two springs.

In addition to one or more of the features described herein, the load sensing and control system includes an angle correction system operable to adjust the vehicle loading factor based on a detected angle of the frame.

In addition to one or more of the features described herein, the load sensing and control system includes a self-calibration system operable to adjust the vehicle loading factor based on changes to the suspension system.

In addition to one or more of the features described herein, the load sensing and control unit includes a communication system that is operable to send a message to one of a base station and vehicle occupants of an overloaded condition.

In another exemplary embodiment, a method of inhibiting vehicle movement based on sensed load includes monitoring a suspension component in a vehicle for changes resulting from loads, determining in a load sensing module, before the vehicle moves, whether a loading condition exists that exceeds a predetermined load value, and inhibiting movement of the vehicle if the loading condition exceeds the predetermined load value.

In addition to one or more of the features described herein, monitoring the suspension component includes determining a change in position resulting from vehicle loading.

In addition to one or more of the features described herein, the method further includes determining an angle of the vehicle.

In addition to one or more of the features described herein, determining the change in position includes extracting a vertical component of the change in position.

In addition to one or more of the features described herein, determining the angle of the vehicle includes monitoring one or more of a hill holding axle, a pitch sensor, and a roll sensor.

In addition to one or more of the features described herein, monitoring the hill holding axle includes determining an amount of axle winding.

In addition to one or more of the features described herein, determining the change in position includes detecting a change in compression of the suspension component.

In addition to one or more of the features described herein, detecting the change in compression includes determining a change in vertical height of a vehicle body at each wheel of the vehicle.

In addition to one or more of the features described herein, the method also includes notifying one of an occupant of the vehicle and a remote monitoring station of the loading condition.

In addition to one or more of the features described herein, the method also includes calibrating the load sensing module to accommodate changes in vehicle suspension characteristics.

In yet another exemplary embodiment, a suspension system for a motor vehicle having a frame, an axle connected to the frame, and a prime mover connected to the axle includes a suspension component, a load sensing and control system including at least one load sensor connected to the suspension component, and a controller operatively connected to the at least one load sensor and the prime mover. The controller is operable to calculate a vehicle loading factor before the vehicle moves and to prevent operation of the prime mover if the vehicle loading factor exceeds a selected load threshold.

In addition to one or more of the features described herein, the method also includes wherein the suspension system includes at least two springs connected to the at least one axle, wherein the at least one load sensor detects an amount of compression of each of the at least two springs.

In addition to one or more of the features described herein, the method also includes wherein the load sensing and control system includes an angle correction system operable to adjust the vehicle loading factor based on a detected angle of the frame.

In addition to one or more of the features described herein, the method also includes wherein the load sensing and control system includes a self-calibration system operable to adjust the vehicle loading factor based on changes to the suspension system.

In addition to one or more of the features described herein, the method also includes wherein the load sensing and control unit includes a communication system that is operable to send a message to one of a base station and vehicle occupants of an overloaded condition.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
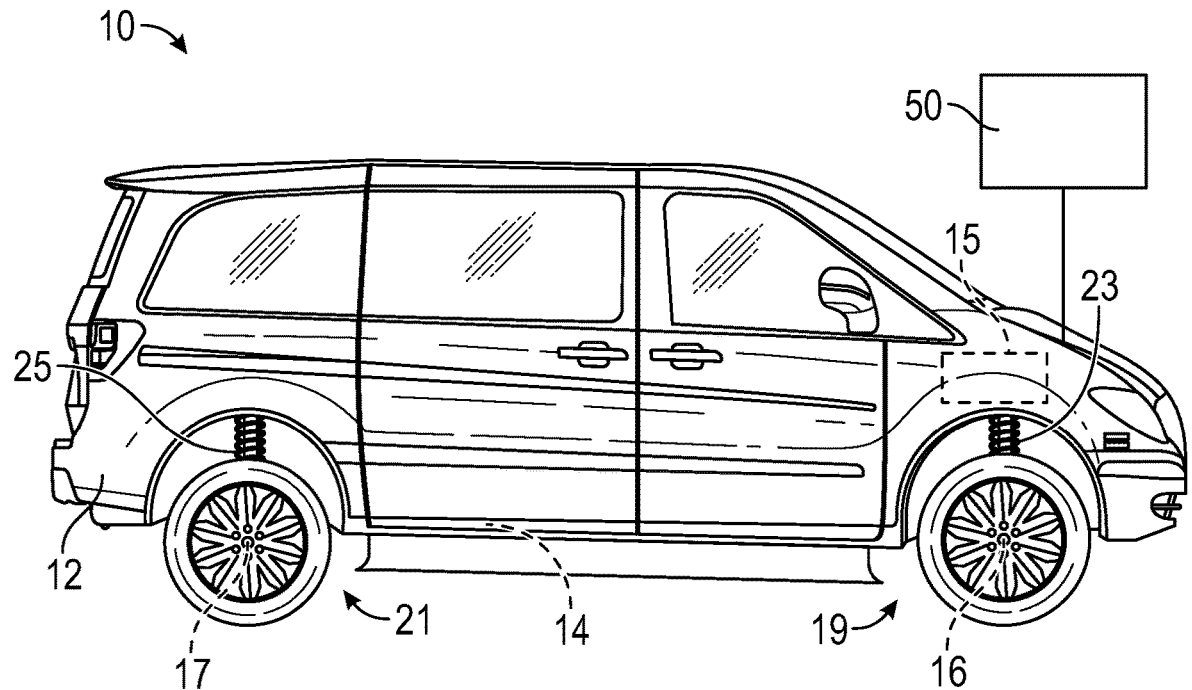
FIG. 1 depicts a vehicle including is a load sensing system, in accordance with an aspect of an exemplary embodiment.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

A vehicle, in accordance with an exemplary embodiment, is indicated at 10 in FIG. 1. Vehicle 10 is shown in the form of a four wheeled minivan. However, it should be understood that vehicle 10 may take on various forms including three-wheeled vehicles, as well as vehicles with six or more wheels. Vehicle 10 includes a body 12 that is supported by a frame 14 and a prime mover 15. Prime mover 15 may take on many forms including internal combustion engines, electric motors, and hybrid electric/combustion engines. Frame 14 supports a front axle 16 and a rear axle 17. Front axle 16 supports first and second front wheels, one of which is shown at 19 and rear axle 17 supports first and second rear wheels, one of which is shown at 21. Front and rear axles 16 and 17 are connected to frame 14 by front and rear suspension systems 23 and 25 respectively. In an embodiment, vehicle 10 takes the form of an autonomous vehicle that is controlled by a driving system, not by a human driver.

Figure 2:
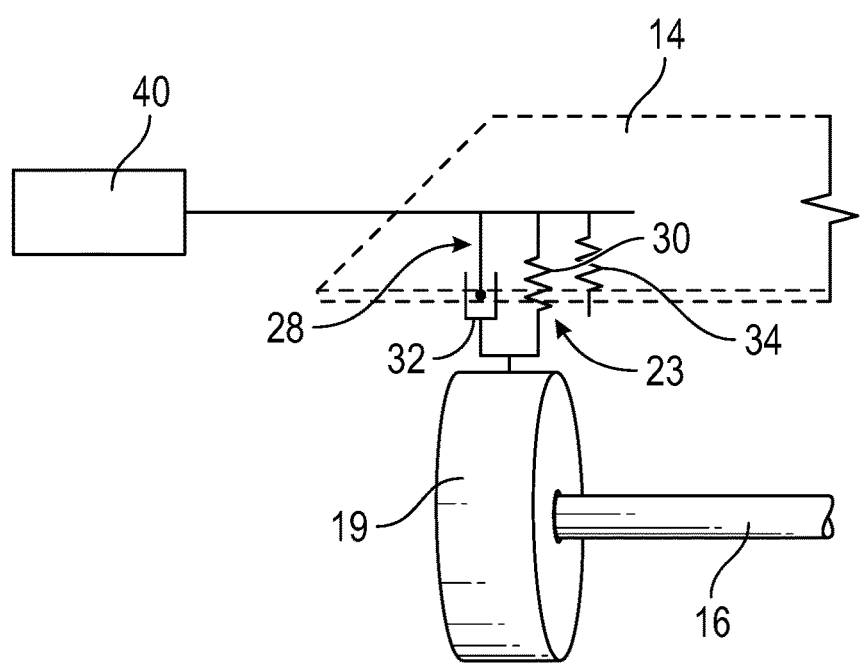
FIG. 2 depicts a suspension component associated with a wheel of the vehicle of FIG. 1, in accordance with an aspect of an exemplary embodiment.

Referring to FIG. 2, front suspension system 23 includes multiple suspension components such as shown at 28 associated with each of the first and second front wheels 19. Rear suspension system 25 includes multiple suspension components (not shown) associated with first and second rear wheels 21. Suspension components 28 may include springs 30, dampers 32, and/or control arms, torsion bars 34. The number, type, and mounting of suspension components 28 may vary. As will be detailed herein, when vehicle 10 is loaded, one or more of suspension components 28 associated with each of the first and second front wheels 19 and/or the first and second rear wheels 21 may compress.

Figure 3:
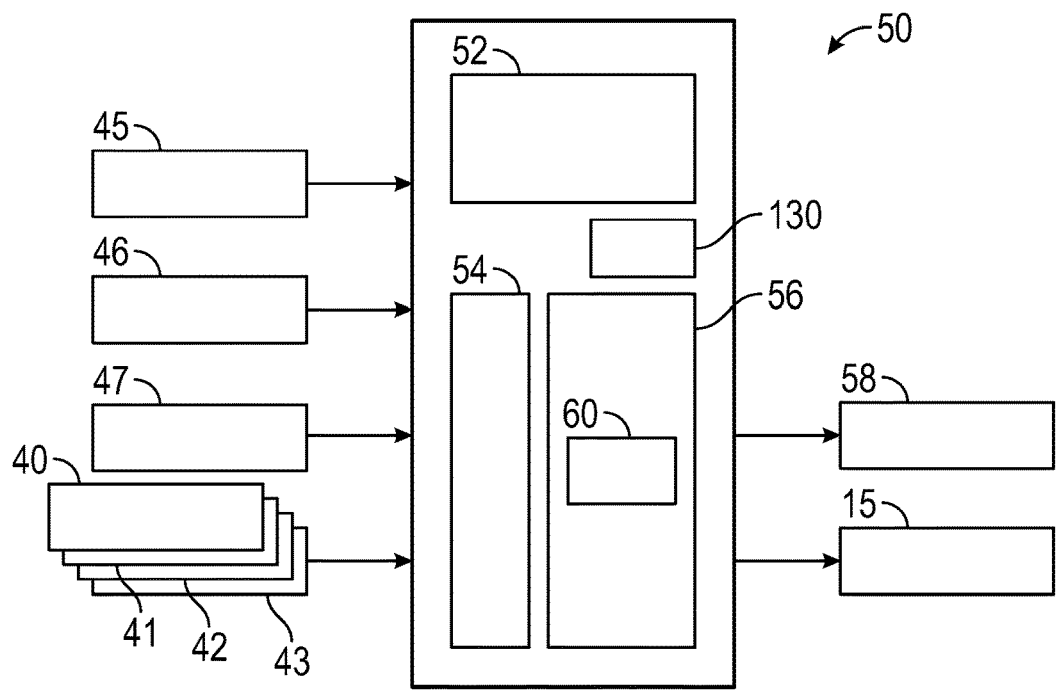
FIG. 3 depicts a block diagram illustrating the load sensing system, in accordance with an aspect of an exemplary embodiment.

As will also be detailed herein, front suspension system 23 includes a load or suspension sensor 40 that determines an amount of compression. Rear suspension system 25 likewise includes a load or suspension sensor as will be detailed herein. That is, as shown in FIG. 3, vehicle 10 may include a total of four load or suspension sensors including suspension sensor 40 as well as suspension sensors 41, 42, and 43 that are associated with others of the first and second front wheels 19 and the first and second rear wheels 21. In addition to suspension sensors 40-43, vehicle 10, may also include a pitch sensor 45 that measures an amount of vehicle pitch, a roll sensor 46 that measures an amount of vehicle roll, and an axle sensor 47. Axle sensor 47 detects an amount of axle winding associated with a hill holding axle such as front axle 16. Pitch sensor 45, roll sensor 46 and/or axle sensor 47 are employed to determine an angle of vehicle 10. More specifically, pitch sensor 45, roll sensor 46 and/or axle sensor 47 are employed to determine how much vehicle 10 departs from a horizontal plane due to road conditions.

In accordance with an exemplary embodiment, vehicle 10 includes a load sensing and control system 50 that determines an amount of load supported by, for example, body 12. Vehicle 10 includes a gross vehicle weight rating (GVWR). Load sensing and control system 50 determines a gross vehicle weight (GVW) or curb weight of vehicle 10 and determines if the GVW is less than the GVWR. If vehicle 10 exceeds the GVWR, prime mover 15 is inhibited from operating. Thus, load sensing and control system 50 prevents undue wear and tear on suspension systems 23 and 25 that could result from over loading vehicle 10.

Load sensing and control system 50 includes a central processing unit 52 that is operatively connected to a non-volatile memory 54 and a load sensing module 56. Non-volatile memory 54 may store the GVWR as well as other data associated with communicating a GVW violation through an output 58. The GVW violation may take the form of an alert to vehicle passengers or a communication to a central control base that may be associated with autonomous control of vehicle 10. Load sensing and control system 50 is operatively connected with compression sensors 40-43 pitch sensor 45, roll sensor 46, and axle sensor 47 as well as prime mover 15. Load sensing and control system 50 may also include an angle correction system 60 that may adjust GVW calculations based on a perceived non-horizontal angle of vehicle 10.

Figure 4:
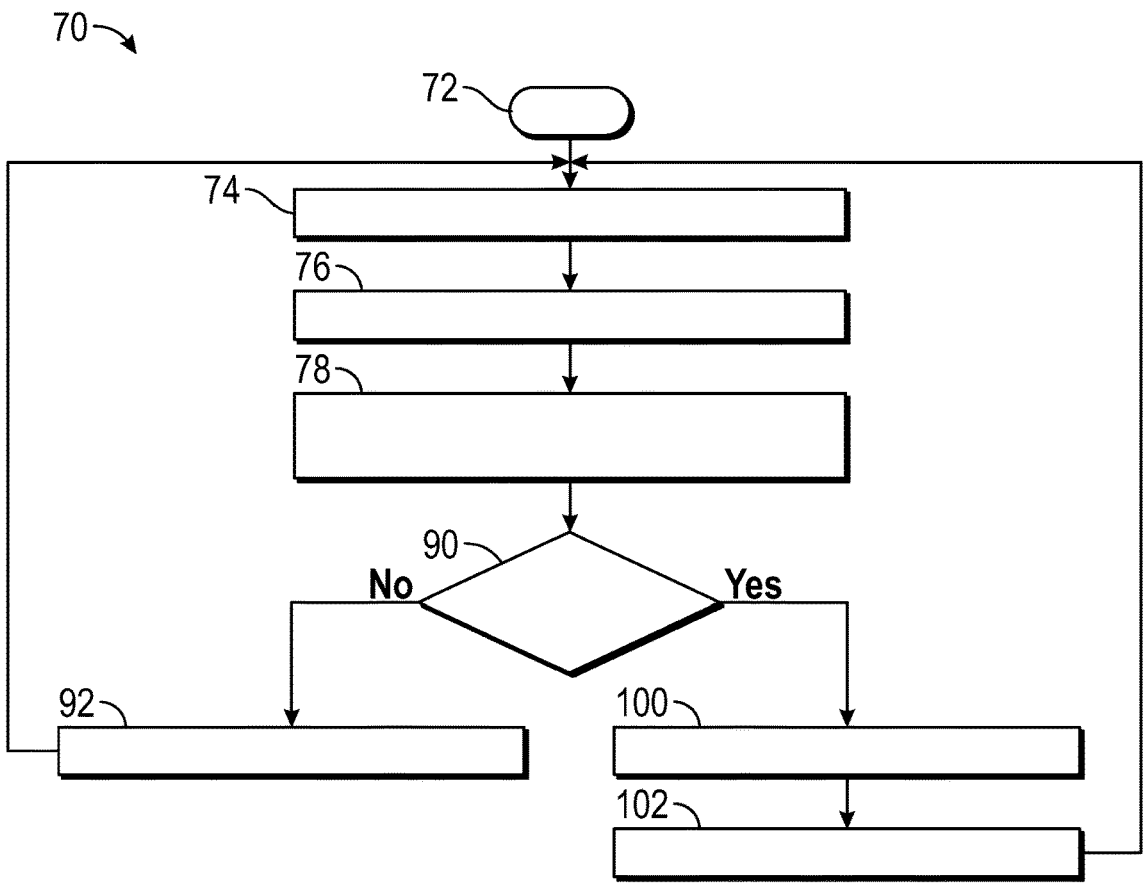
FIG. 4 depicts a flow diagram illustrating a method of sensing vehicle loading and inhibiting vehicle movement based on vehicle loading.

Reference will now follow to FIG. 4 in describing a method 70 of sensing vehicle loading and inhibiting vehicle movement if GVW exceeds the GVWR. In block 72, before vehicle 10 moves, load sensing and control system 50 is active and, in block 74 monitors each of suspension sensors 40, 41, 42, and 43. In block 76, load sensing module 56 determines suspension compression based on vertical loads coming from each of sensors 40, 41, 42, and 43 to calculate GVW. In block 78, load sensing module 56 may include an angle correction system corrects the vertical loading from sensors 40-43 based on data from pitch sensor 45, roll sensor 46, and/or axle sensor 47. That is, load sensing module 56 determines an angle of vehicle 10 and, based on that angle, angle correction system 60 extracts the vertical component of the compression to determine actual GVW.

In block 90, load sensing module 56 compares the sensed GVW with the GVWR stored in, for example, non-volatile memory 54. If the GVW is below the GVWR, load sensing and control system 50 allows prime mover 15 to motivate vehicle 10 in block 92. If, however, GVW exceeds the GVWR, load sensing module 56 inhibits operation of prime mover 15 in block 100 until such a time as the GVW is reduced to acceptable limits. Load sensing module 56 may also issue a notification to passengers in vehicle 10 via output 58 of the excessive loading condition in block 102. The excessive loading condition may also be communicated to a base station associated with vehicle 10. Inhibiting movement of vehicle 10 when GVW exceeds the GVWR reduces wear and tear on suspension system 23 prolonging the service life of suspension components 28.

In further accordance with an exemplary aspect, load sensing and control system 50 includes a self-calibration module 130 that accounts for changes, over time, in vehicle suspension characteristics. That is, over time, springs, dampers, and other suspension components may take a set, sag, or otherwise change how a response to weight is perceived. Thus, load sensing and control system 50 periodically calibrates load sensing module 56. For example, when vehicle 10 is perceived to be in an unladen configuration, and on level ground, load sensing and control system 50 evaluates changes in outputs from suspension sensors 40-43. The signal changes from suspension sensors 40-43 are fed into load sensing module 56 and used to adjust GVW calculations to accommodate physical and characteristic changes of suspension system 23.

While the above disclosure has been described with reference to exemplary embodiments, it will be understood by those skilled in the art that various changes may be made, and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed but will include all embodiments falling within the scope thereof

What is claimed is:

1. A vehicle comprising:
    a frame;
    a body supported by the frame;
    a prime mover mounted to the frame;
    a hill holding axle connected to the frame;
    a suspension system including a suspension component connecting the at least one axle to the frame; and
    a load sensing and control system comprising:
        at least one load sensor connected to the suspension system;
        at least one angle sensor including one or more of a pitch sensor, a roll sensor, and an axle sensor connected to the hill holding axle;
        an angle correction system operatively connected to the at least one angle sensor; and
        a controller operatively connected to the at least one load sensor and the angle correction system, and the prime mover, the controller being operable to calculate a vehicle loading factor corrected for an angle of the frame based, at least in part, on an amount of axle winding of the hill holding axle sensed by the axle sensor before the vehicle moves and to prevent operation of the prime mover if the vehicle loading factor exceeds a selected load threshold.

2. The vehicle according to claim 1, wherein the suspension system includes at least two springs connected to the at least one axle, wherein the at least one load sensor detects an amount of compression of each of the at least two springs.

3. The vehicle according to claim 2, wherein the load sensing and control system includes a self-calibration system operable to adjust the vehicle loading factor based on changes to the suspension system.

4. The vehicle according to claim 1, wherein the load sensing and control unit includes a communication system that is operable to send a message to one of a base station and vehicle occupants of an overloaded condition.

5. A method of inhibiting vehicle movement based on sensed load, the method comprising:
    monitoring a suspension component including a hill holding axle in a vehicle for changes resulting from loads;
    detecting an angle of the vehicle with at least one angle sensor, the angle sensor including an axle sensor that determines the angle of the vehicle based on an amount of axle winding of the hill holding axle;
    determining in a load sensing module, before the vehicle moves, whether a loading condition, corrected for an angle of the vehicle, exceeds a predetermined load value; and
    inhibiting movement of the vehicle if the loading condition exceeds the predetermined load value.

6. The method of claim 5, wherein monitoring the suspension component includes determining a change in position resulting from vehicle loading.

7. The method of claim 6, wherein determining the change in position includes extracting a vertical component of the change in position.

8. The method of claim 5, wherein detecting the angle of the vehicle with the at least one angle sensor further includes monitoring one or more of a pitch sensor, and a roll sensor.

9. The method of claim 6, wherein determining the change in position includes detecting a change in compression of the suspension component.

10. The method of claim 9, wherein detecting the change in compression includes determining a change in vertical height of a vehicle body at each wheel of the vehicle.

11. The method of claim 6, further comprising: notifying one of an occupant of the vehicle and a remote monitoring station of the loading condition.

12. The method of claim 6, further comprising: calibrating the load sensing module to accommodate changes in vehicle suspension characteristics.

13. A suspension system for a motor vehicle having a frame, a hill holding axle connected to the frame, and a prime mover connected to the axle, the suspension system comprising:
    a suspension component; and
    a load sensing and control system including at least one load sensor connected to the suspension component, at least one angle sensor including one or more of a pitch sensor, a roll sensor, and an axle sensor that determines an amount of axle winding of the hill holding axle, an angle correction system operatively connected to the at least one angle sensor; and a controller operatively connected to the at least one load sensor and the prime mover, the controller being operable to calculate a vehicle loading factor corrected for an angle of the frame based, at least in part, on an amount of axle winding of the hill holding axle as sensed by the axle sensor before the vehicle moves and to prevent operation of the prime mover if the vehicle loading factor exceeds a selected load threshold.

14. The suspension system according to claim 13, wherein the suspension system includes at least two springs connected to the at least one axle, wherein the at least one load sensor detects an amount of compression of each of the at least two springs.

15. The suspension system according to claim 14, wherein the load sensing and control system includes a self-calibration system operable to adjust the vehicle loading factor based on changes to the suspension system.

16. The suspension system according to claim 13, wherein the load sensing and control unit includes a communication system that is operable to send a message to one of a base station and vehicle occupants of an overloaded condition.

\* \* \* \* \*